United States Patent
Burrows et al.

(10) Patent No.: US 9,904,136 B2
(45) Date of Patent: Feb. 27, 2018

(54) LIGHT MASKED SMART GLAZING

(71) Applicant: Cardinal CG Company, Eden Prairie, MN (US)

(72) Inventors: Keith James Burrows, Mineral Point, WI (US); Klaus Hartig, Avoca, WI (US)

(73) Assignee: Cardinal CG Company, Eden Prairie, MN (US)

( * ) Notice: Subject to any disclaimer, the term of this patent is extended or adjusted under 35 U.S.C. 154(b) by 50 days.

(21) Appl. No.: 14/668,636

(22) Filed: Mar. 25, 2015

(65) Prior Publication Data

US 2015/0277165 A1    Oct. 1, 2015

Related U.S. Application Data

(60) Provisional application No. 61/971,952, filed on Mar. 28, 2014.

(51) Int. Cl.
| | |
|---|---|
| G02F 1/1335 | (2006.01) |
| G02F 1/137 | (2006.01) |
| G02F 1/153 | (2006.01) |
| G02F 1/1339 | (2006.01) |
| E06B 9/24 | (2006.01) |

(52) U.S. Cl.
CPC ............. *G02F 1/137* (2013.01); *E06B 9/24* (2013.01); *G02F 1/1339* (2013.01); *G02F 1/133615* (2013.01); *G02F 1/153* (2013.01); *E06B 2009/247* (2013.01); *E06B 2009/2464* (2013.01); *G02F 2001/13756* (2013.01)

(58) Field of Classification Search
None
See application file for complete search history.

(56) References Cited

U.S. PATENT DOCUMENTS

| | | |
|---|---|---|
| 3,280,701 A | 10/1966 | Donnelly et al. |
| 6,239,898 B1 | 5/2001 | Byker et al. |

(Continued)

FOREIGN PATENT DOCUMENTS

| | | |
|---|---|---|
| DE | 19529737 C1 | 12/1996 |
| DE | 10322561 A1 | 12/2004 |

(Continued)

OTHER PUBLICATIONS

International Search Report and Written Opinion dated Jul. 3, 2015 for related International Application PCT/US2015/022503, 12 pages.

*Primary Examiner* — Richard Kim
(74) *Attorney, Agent, or Firm* — Fredrikson & Byron, P.A.

(57) ABSTRACT

A multiple-pane insulating glazing unit may include multiple panes of transparent material and a layer of electrically controllable optically active material that provides controllable privacy for the glazing unit. Despite efforts to fully black out the multiple-pane insulating glazing unit by switching the optically active material from a transmissive state to a privacy state, the glazing unit may exhibit some residual direct visible transmission. In some examples, the multiple-pane insulating glazing unit may include a light emitting element positioned to direct light at the layer of optically active material to address this issue. Light emitted by the light emitting element may reflect and mask residual visibility through the electrically controllable optically active material.

28 Claims, 7 Drawing Sheets

(56) References Cited

U.S. PATENT DOCUMENTS

| | | |
|---|---|---|
| 6,594,065 B2 | 7/2003 | Byker et al. |
| 6,671,008 B1 | 12/2003 | Li et al. |
| 7,300,167 B2 | 11/2007 | Fernando et al. |
| 7,525,604 B2 | 4/2009 | Xue |
| 8,102,478 B2 | 1/2012 | Xue |
| 2007/0218217 A1 | 9/2007 | Fernando et al. |
| 2008/0158448 A1 | 7/2008 | Fernando et al. |
| 2012/0069599 A1* | 3/2012 | Cornelissen ............ G09F 13/18 362/613 |

FOREIGN PATENT DOCUMENTS

| | | |
|---|---|---|
| WO | 2003067014 A1 | 8/2003 |
| WO | 2009146371 A1 | 12/2009 |

* cited by examiner

LIGHT MASKED SMART GLAZING

This application claims priority to U.S. Provisional Application No. 61/971,952 filed Mar. 28, 2014, the entire contents of which are incorporated herein by reference.

TECHNICAL FIELD

This disclosure relates to optical structures and, more particularly, to glazing structures that include a controllable optically active material.

BACKGROUND

Windows, doors, partitions, and other structures having controllable tinting have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled privacy for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

Regardless of the type of controlled privacy technology used for a smart structure, few if any structures block one hundred percent of directly transmitted visible light when private. Rather, even high performing technologies can still allow a small amount of direct visible transmittance through the structure when in a privacy state. This may allow an observer looking through the structure to see general shapes and motion on the opposite side of the structure. In applications where absolute privacy is not of primary importance, such as an automobile window where privacy glass is used to block sunlight and keep the interior of the automobile cool, residual transmittance is generally not of concern. On the other hand, for residential window and door applications, consumers generally desire absolute privacy when their windows and doors are in a privacy state. This is particularly true at night when illumination from the interior of a home can provide backlighting that helps highlight structures behind a privacy darkened window or door to an outside observer.

SUMMARY

In general, this disclosure relates to privacy structures that incorporate a light emitting source to shine light on or away from the structure when it is placed in a privacy state. In some examples, a privacy structure is in the form of a multiple-pane insulating glazing unit having first and second panes of transparent material along with a spacer separating the transparent panes of material to provide a between-pane space. The multiple-pane insulating glazing unit carries a layer of electrically controllable optically active material positioned behind one of the panes of transparent material. The electronically controllable optically active material can be controllably alternated between a light transmissive state and a privacy state, such as a light scattering or light absorbing state. When placed in the privacy state, light impinging upon the optically active material can scatter and/or absorb rather than pass through the material, obscuring visibility through the material to an external observer. Although typically intended to completely obscure visibility through the material, in practice, the optically active material may still allow a limited amount of light to directly transmit through the material. This transmitting light may be referred to as residual visibility, as it is the visibility that still remains after the optically active material has been transitioned to a privacy state.

To help mask this residual visibility through the optically active material, the multiple-pane insulating glazing unit can include a light emitting element. Although the location of the light emitting element can vary, in one example, the light emitting element is positioned to direct light at the optically active material through at least one of the panes of the multiple-pane insulating glazing unit. For example, the light emitting element may be embedded in the spacer of the multiple-pane insulating glazing unit or a frame surrounding the glazing unit and pointed to direct light at an angle with respect to a planar face of the optical active material. In operation, the light emitting element can emit light at the optically active material when the material is placed in its privacy state. The light impinging upon the optically active material may reflect off the material, screening any residual visibility through the structure. For example, the reflected light may generate light pollution that, when seen by an external observer, prevents the observer's eyes from adjusting to the low level of light still transmitting directly through the structure. This may help mask the residual visibility.

In another configuration, the light emitting element is positioned to direct light away from the optically active material and toward the direction of an external observer. For example, the light emitting element may be embedded in a frame surrounding the glazing unit and pointed to direct light away from the planar face of the optically active material. Alternatively, the glazing unit may carry a light emitting element that is a light emitting coating, such as an organic light-emitting diode film, that emits light away from and towards the optically active material. In either case, the light emitting element can emit light away from the optically active material. The emitted light may combine with light passing through the optically active material when in a privacy state, screening residual visibility through the material.

In one example, a glazing structure is described that includes a first substrate, a second substrate, a layer of electrically controllable optically active material, and at least one light emitting element. The example specifies that the layer of electrically controllable optically active material is positioned between the first substrate and the second substrate and has a light transmissive state and a privacy state. The at least one light emitting element is positioned to direct light at either the first substrate or the second substrate. The example further specifies that the at least one light emitting element is configured to be inactive when the electronically controllable optically active material is in the light transmissive state but activate when the electronically controllable optically active material is placed in the privacy state such that light emitted by the at least one light emitting element reflects and masks residual visibility through the electrically controllable optically active material when in the privacy state.

In another example, a multiple-pane insulating glazing unit is described that includes a first pane of transparent material, a second pane of transparent material that is generally parallel to the first pane of transparent material, and a spacer positioned between the first pane of transparent material and the second pane of transparent material to define a first between-pane space. The glazing unit also includes a layer of electrically controllable optically active material positioned behind the second pane of transparent material having a light transmissive state and a privacy state. The example specifies that the at least one light emitting element is positioned to direct light at the layer of electrically controllable optically active material through at least the second pane of transparent material such that light emitted by the at least one light emitting element reflects and masks residual visibility through the electrically controllable optically active material when in the privacy state.

In another example, a method is described that includes controlling an optically active material to transition the optically active material from a light transmissive state to a privacy state, and directing light through a transparent substrate at the optically active material in the privacy state, thereby causing at least a portion of the light to reflect and mask residual visibility through the optically active material.

The details of one or more examples are set forth in the accompanying drawings and the description below. Other features, objects, and advantages will be apparent from the description and drawings, and from the claims.

DETAILED DESCRIPTION

In general, the disclosure relates to devices and techniques providing a light emitting element to mask residual visibility through a privacy structure when in the privacy state. In some examples, a glazing structure carries one or more light emitting elements positioned to direct light through a substrate and at an electronically controllable optically active material. In different examples, the glazing structure may be a single-pane glazing structure, a double-pane glazing structure, a triple-pane glazing structure, or may include even more glazing panes. Regardless of the number of panes, the glazing structure can carry the layer of electronically controllable optically active material by sandwiching the material between two substrates. The light emitting elements carried by the glazing structure can be positioned to direct light through at least one of the substrates sandwiching the layer of electronically controllable optically active material and, optionally, additional panes of the glazing structure. In operation, the light emitting elements may activate to shine light at the layer of electronically controllable optically active material when the layer is placed in a privacy state. Light reflecting off of the optically active material and/or surfaces of the substrate(s) through which the light is directed may screen direct visible transmittance through the optically active material. Accordingly, this screening may mask residual visibility through the structure. When the electronically controllable optically active material is transitioned from a privacy state back to a visible state, the light emitting elements may turn off to avoid unnecessary light on the structure.

Figure 1:
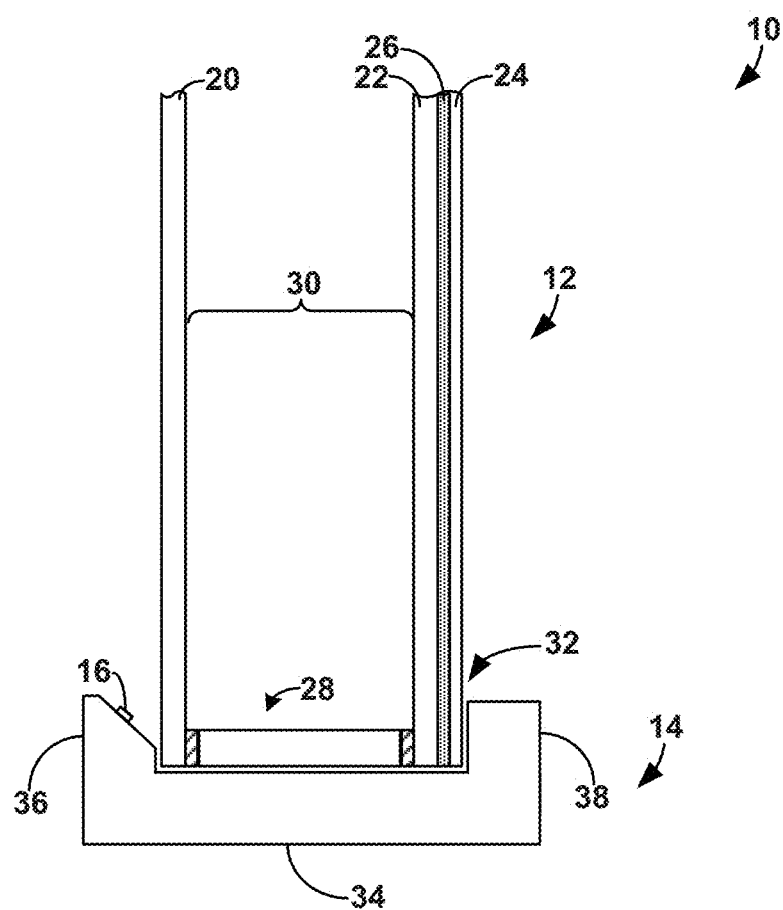
FIG. 1 is a partial side view illustration of an example glazing structure that includes a light emitting element configured to mask residual visibility through the structure.

FIG. 1 is a partial side view illustration of an example glazing structure 10 that includes a multiple-pane insulating glazing unit 12, a frame 14, and at least one light emitting element 16. Frame 14 is positioned around an external perimeter of multiple-pane insulating glazing unit 12. In addition, in this example, multiple-pane insulating glazing unit 12 includes a first substrate 20, a second substrate 22, a third substrate 24, and a layer of optically active material 26. The layer of optically active material 26 is positioned between the second substrate 22 and the third substrate 24. The layer of optically active material 26 can transition from a generally transparent state to a privacy state to control visibility through glazing structure 10. In the privacy state, the layer of optically active material 26 may be dark or hazy, obscuring viewing through the material.

As described in greater detail below, light emitting element 16 is carried by glazing structure 10 and positioned to direct light at the layer of optically active material 26. When the layer of optically active material 26 is placed in a privacy state, light emitting element 16 can shine light on the optically active material. Light emanating from light emitting element 16 can impinge upon the optically active material in the privacy state and can reflect back in the general direction of emission. This reflected light can screen residual light transmitting through glazing structure 10 when the layer of optically active material 26 is in the privacy state. Accordingly, the reflection from light emitting element 16 can help mask or cover residual visibility through the layer of optically active material 26, when the material is in a privacy state. For example, if a human observer positioned on one side of glazing structure 10 were attempting to observe objects on the opposite side of the structure without light emitting element 16, the observer may perceive movement or the general shape of the objects, even when the layer of optically active material 26 is in a privacy state. When light emitting element 16 is active, however, light generated by the element may prevent the observer from perceiving any movement or object shapes.

Glazing structure 10 can utilize any suitable privacy materials for the layer of optically active material 26. Further, although optically active material 26 is generally illustrated and described as being a single layer of material, it should be appreciated that a structure in accordance with the disclosure can have one or more layers of optically active material with the same or varying thicknesses. In general, optically active material 26 is configured to provide controllable and reversible optical obscuring and lightening.

Optically active material 26 can change visible transmittance in response to an energy input, such as light, heat, or electricity. For example, optically active material 26 may be an electronically controllable optically active material that changes direct visible transmittance in response to changes in electrical energy applied to the material.

In one example, optically active material 26 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 26 is formed of a liquid crystal material. Different types of liquid crystal materials that can be used as optically active material 26 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrodes. The electrodes can be formed by coating opposed substrates (e.g., second substrate 22 and third substrate 24) with a transparent conductive material. When the electric field is off, the liquid crystals are randomly scattered. This scatters light entering the liquid crystal material and blocks transmission through the material. When a certain voltage is applied between the two electrodes, the liquid crystals homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to a homeotropic state, causing the liquid crystals to reorient themselves parallel to each other along with the electric field. This causes the liquid crystals to increase in optical transparency and allows light to transmit through the crystals. In a reverse mode polymer stabilized cholesteric texture material, the liquid crystals are transparent in the absence of an electric field (e.g., zero electric field) but opaque and scattering upon application of an electric field.

In one example in which the layer of optically active material 26 is implemented using a liquid crystal material, the liquid crystal material turns dark when transitioned to the privacy state. Such a material may absorb light impinging upon the material to prevent an observer on one side of glazing structure 10 from clearly observing activity occurring on the opposite side of the structure. Such a material may significantly reduce the total visible transmittance through the material when in the privacy state, as compared to when in the light transmitting state.

In another example in which the layer of optically active material 26 is implemented using a liquid crystal material, the liquid crystal material turns hazy when transitioned to the privacy state. Such a material may scatter light impinging upon the material to prevent an observer on one side of glazing structure 10 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 26.

Another type of material that can be used as the layer of optically active material 26 is a suspended particle material. Suspended particle materials are typically dark or opaque in a non-activated state but become transparent when a voltage is applied. Yet other examples of materials that can be used as optically active material 26 include thermochromic materials that change visible transmittance in response to changing temperature and photochromic materials that change visible transmittance in response to changing amounts of light.

Independent of the specific type of material(s) used for the layer of optically active material 26, the material can change from a light transmissive state in which insulating glazing unit 12 is intended to be transparent to a privacy state in which visibility through the insulating glazing unit is intended to be blocked. Optically active material 26 may exhibit progressively decreasing direct visible transmittance when transitioning from a maximum light transmissive state to a maximum privacy state. Similarly, optically active material 26 may exhibit progressively increasing direct visible transmittance when transitioning from a maximum privacy state to a maximum transmissive state. The speed at which optically active material 26 transitions from a generally transparent transmission state to a generally opaque privacy state may be dictated by a variety of factors, including the specific type of material selected for optically active material 26, the temperature of the material, the electrical voltage applied to the material, and the like.

When transitioned to the privacy state, light impinging upon the surface of optically active material 26 may be scattered (e.g., reflected) and/or absorbed rather than transmitted through the material for observation on an opposite side of glazing structure 10. For those seeking complete privacy, it is typically desired that optically active material 26 exhibit zero direct visible transmittance when in a maximum light scattering privacy state. Visible transmittance is a measure of the amount of light within the visible spectrum (e.g., ranging from a wavelength of 380 nanometers to 780 nanometers) that passes through the optically active material 26 without scattering. Visible transmittance can be measured in accordance with ASTM E308 and ASTM E903 and is generally reported as a percentage.

Although it is generally desired by manufacturers and consumers of glazing structures incorporating an optically active material that the optically active material transition to complete or zero visible transmittance in the privacy state, in practice, most optically active materials transition to a low direct visible transmittance greater than zero. For instance, depending on the type of material used for the layer of optically active material 26, the material may exhibit a direct visible transmittance greater than 0 percent when in a light scattering privacy state (e.g., at maximum opacity), such a direct visible transmittance greater than 0.01 percent, greater than 0.05 percent, or greater than 0.5 percent. For example, the layer of optically active material 26 may exhibit a visible transmittance ranging from 0.05 percent to 1 percent when in the light scattering privacy state, such as from 0.1 percent to 0.8 percent. Even at these low direct visible transmittance levels, an unaided human eye may detect light passing through optically active material 26 when in the privacy state. As discussed in more depth below, light emitting element 16 may help compensate for the lack of complete privacy afforded by optically active material 26 to the privacy state.

When installed, glazing structure 10 is designed such that optically active material 26 can transition from a privacy state to a generally transparent state, allowing light to pass from one side of the structure through to another side of the unit. When transitioned to this light transmissive state, light present on one side of glazing structure 10 (e.g., an outdoor side) can pass through to an opposite side of the unit (e.g., an indoor side) for illuminating a space and/or to allow a user positioned to one side of the unit to observe activity occurring on another side of the unit. Although the direct visible transmittance of optically active material 26 may vary, e.g., depending on the type of material used, in some applications, the material exhibits a direct visible transmittance greater than 60 percent when in a light transmissive state (e.g., at maximum transparency), such as a direct visible transmittance ranging from 65 percent to 85 percent.

In the example of FIG. 1, optically active material 26 is physically attached to and carried by multiple-pane insulating glazing unit 12. Multiple-pane insulating glazing unit 12 in this example has a first substrate 20, a second substrate 22, and a third substrate 24. Multiple-pane insulating glazing unit 12 also includes a spacer 28. Spacer 28 holds first substrate 20 generally parallel to and spaced apart from second substrate 22 to define between-pane space 30. Spacer 28 can extend around the entire perimeter of multiple-pane insulating glazing unit 12 to hermetically seal the between-pane space 30 from gas exchange with a surrounding environment.

Spacer 28 can be any structure that holds opposed substrates in a spaced apart relationship over the service life of multiple-pane insulating glazing glass unit 12 and seals a between-pane space between the opposed panes of material, e.g., so as to inhibit or eliminate gas exchange between the between-pane space and an environment surrounding insulating glazing unit 12. One example of a spacer that can be used as spacer 28 is a tubular spacer positioned between first substrate 20 and second substrate 22. The tubular spacer may define a hollow lumen or tube which, in some examples, is filled with desiccant. The tubular spacer may have a first side surface adhered (by a first bead of sealant) to first substrate 20 and a second side surface adhered (by a second bead of sealant) to second substrate 22. A top surface of the tubular spacer can exposed to between-pane space 30 and, in some examples, includes openings that allow gas within the between-pane space to communicate with desiccating material inside of the spacer. Such a spacer can be fabricated from aluminum, stainless steel, a thermoplastic, or any other suitable material. Advantageous glazing spacers are available commercially from Allmetal, Inc. of Itasca, Ill., U.S.A.

Another example of a spacer that can be used as spacer 28 is a spacer formed from a corrugated metal reinforcing sheet surrounded by a sealant composition. The corrugated metal reinforcing sheet may be a rigid structural component that holds first substrate 20 apart from second substrate 22. Such a spacer is often referred to in commercial settings as swiggle spacer. In yet another example, spacer 28 may be formed from a foam material surrounded on all sides except a side facing a between-pane space with a metal foil. Such a spacer is commercially available from Edgetech under the trade name Super Spacer®. As another example, spacer 28 may be a thermoplastic spacer (TPS) spacer formed by positioning a primary sealant (e.g., adhesive) between first substrate 20 and second substrate 22 followed, optionally, by a secondary sealant applied around the perimeter defined between the substrates and the primary sealant. Spacer 28 can have other configurations, as will be appreciated by those of ordinary skill in the art.

To minimize thermal exchange across multiple-pane insulating glazing unit 12, between-pane space 30 can be filled with an insulative gas or even evacuated of gas. For example, between-pane space 30 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 30 may be evacuated so that the between-pane space is at vacuum pressure relative to the pressure of an environment surrounding multiple-pane insulating glazing unit 12. When between-pane space 30 is evacuated to create a vacuum environment, the glazing unit may be referred to as a vacuum multiple-pane insulating glazing unit.

Multiple-pane insulating glazing unit 12 in the example of FIG. 1 has three substrates: first substrate 20, second substrate 22, and third substrate 24. First substrate 20 and second substrate 22 define between-pane space 30 which, as discussed above, can minimize thermal transfer across the glazing unit. Third substrate 24 is positioned on an opposite side of optically active material 26 from second substrate 22, positioning the optically active layer between two protective substrates. Each substrate may be formed from the same material, or at least one of the first substrate 20, the second substrate 22, and the third substrate 24 may be formed of a material different than one or both of the other substrates. In some examples, the first substrate 20, the second substrate 22, and the third substrate 24 are transparent panes of material. For example, at least one (and optionally all) the substrates of multiple-pane insulating glazing unit 12 can be formed of glass (e.g., sodium-lime-silicate glass, clear glass). In other examples, at least one (and optionally all) the substrates of insulating glazing unit 12 are formed of plastic such as, e.g., a fluorocarbon plastic, polypropylene, polyethylene, polyester, or polycarbonate. As one configuration in accordance with this example, first substrate 20 and second substrate 22 can be formed of glass while third substrate 24 is formed of plastic. The plastic material forming third substrate 24 can either be a rigid plastic or a flexible plastic film backing optically active material 26. In still other examples, at least one (and optionally all) the substrates of insulating glazing unit 12 are formed from multiple different types of materials. For example, the substrates may be formed of a laminated glass, which may include two panes of glass bonded together with polyvinyl butyral.

Depending on application, the first substrate 20, the second substrate 22, and/or the third substrate 24 may be coated with one or more functional coatings to modify the performance of multiple-pane insulating glazing unit 12. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. Advantageous low-emissivity coatings include the LoE-180™, LoE-272™, and LoE-366™ coatings available commercially from Cardinal CG Company of Spring Green, Wis., U.S.A. A photocatalytic coating, by contrast, may be a coating that includes a photocatalyst, such as titanium dioxide. In use, the photocatalyst may exhibit photoactivity that can help self-clean, or provide less maintenance, for the panes. Advantageous photocatalytic coatings include the NEAT® coatings available from Cardinal CG Company.

In general, the surfaces of multiple-pane insulating glazing unit 12 are numbered sequentially starting with a surface of the glass that is facing an external (e.g., outside environment). When insulating glazing unit 12 in the example of FIG. 1 is positioned so that the first substrate 20 faces an exterior environment and the third substrate 24 faces an interior environment, the surface of the first substrate facing the exterior environment may be designated the #1 surface while the opposite surface of the pane facing between-pane space 30 may be designated the #2 surface. Continuing with this example, the surface of the second substrate 22 facing the between-pane space 30 may be designated the #3 surface while the opposite surface of the substrate facing the layer of optically active material 26 may be designated the #4 surface.

When a low emissivity coating is used, the low emissivity coating may be positioned on any surface of any substrate of insulating glazing unit 12, including on multiple surfaces of the same or different substrates of the unit. In instances when insulating glazing unit 12 includes a single low emissivity coating, for example, the coating may be positioned on the #2 and/or #3 surfaces of insulating glazing unit 12. When a photocatalytic coating is used, the photocatalytic coating is typically positioned on the #1 surface of insulating glazing unit 12. Another example coating that may be used on insulating glazing unit 12 is an anti-reflective coating. When used, the anti-reflective coating may be positioned on the #1 surface of insulating glazing unit 12 and/or the #2 and/or #3 surfaces of the unit.

The substrates of multiple-pane insulating glazing unit 12 can be coated with additional or different coatings depending on the application. For example, when optically active material 26 is selected to be an electrically controllable optically active material, insulating glazing unit 12 may include electrodes positioned on opposite sides of the material to control the optical state of the material. The electrodes can be physically separate from second substrate 22 and third substrate 24 or, instead, can be formed by depositing an electrically conductive coating on one or both of the substrates. In one example, second substrate 22 and third substrate 24 are each coated with a transparent conductive oxide ("TCO") coating, such as aluminum-doped zinc oxide and/or tin-doped indium oxide. The transparent conductive oxide coatings can be electrically connected to a power source through electrical conductors extending through frame 14.

Multiple-pane insulating glazing unit 12 can be used in any desired application, including in a door, a window, a wall (e.g., wall partition), a skylight in a residential or commercial building, or in other applications. To help facilitate installation of multiple-pane insulating glazing unit 12, glazing structure 10 includes frame 14. Frame 14 surrounds an exterior perimeter of multiple-pane insulating glazing unit 12 and, in different examples, can be fabricated from wood or a plastic material such a vinyl. Frame 14 defines a channel 32 that receives and holds multiple-pane insulating glazing unit 12. Channel 32 is illustrated as being formed from a base member 34, a first upward extending member 36, and a second upward extending member 38. Base member 34 is positioned adjacent to and, optionally, in contact with a perimeter edge of insulating glazing unit 12. First upward extending member 36 extends away from base member 34 parallel to the face of first substrate 20 and can be positioned to abut an outward facing surface of the substrate. Second upward extending member 38 extends away from base member 34 parallel to the face of third substrate 24 and can be positioned to abut an outward facing surface of the substrate. It should be appreciated that although FIG. 1 illustrates one particular configuration of frame 14, other frame designs can be used and the disclosure is not limited in this respect.

As noted above, glazing structure 10 includes light emitting element 16. Light emitting element 16 is positioned to direct light at the layer of optically active material 26. When the layer of optically active material 26 is turned to a light scattering privacy state, light emitting element 16 can activate (e.g., energize), causing the light emitting element to shine light on the opaque optically active material. At least a portion of the light emitted by light emitting element 16 and impinging upon the opaque optically active material can reflect back in the general direction of emission. This reflected light can combine with direct visible light transmitted through optically active material 26 from an opposite side. As a result, the reflected light can help mask or obscure residual visibility through glazing structure 10 when the layer of optically active material 26 is in a privacy state.

For example, if light emitting element 16 were not present, a human observer positioned in front of glazing structure 10 (e.g., looking through first substrate 20 followed by second substrate 22) may be able to detect light originating from the opposite side of the glazing structure and transmitting though the glazing structure, even though optically active material 26 is in a privacy state. This transmitting light can provide residual visibility since it allows an observer to view the residual or remaining light passing through the layer of optically active material 26 after the material has transitioned from a light transmissive state to a privacy state. With the addition of light emitting element 16, however, light emitted by the element can reflect from the layer of optically active material 26 back toward the front of glazing structure 10 (e.g., by reflecting back through second substrate 22 followed by first substrate 20). This reflected light can combine with the residual light transmitted through glazing structure 10, preventing the human observer from resolving the reflected light from the light transmitted through the structure. For example, the reflected light may prevent the human observer's eyes from dilating to an extent suitable to resolve the low level of direct visible transmission still passing through glazing structure 10. As a result, the reflected light can obscure and hide remaining visualization through glazing structure 10.

Figure 2:
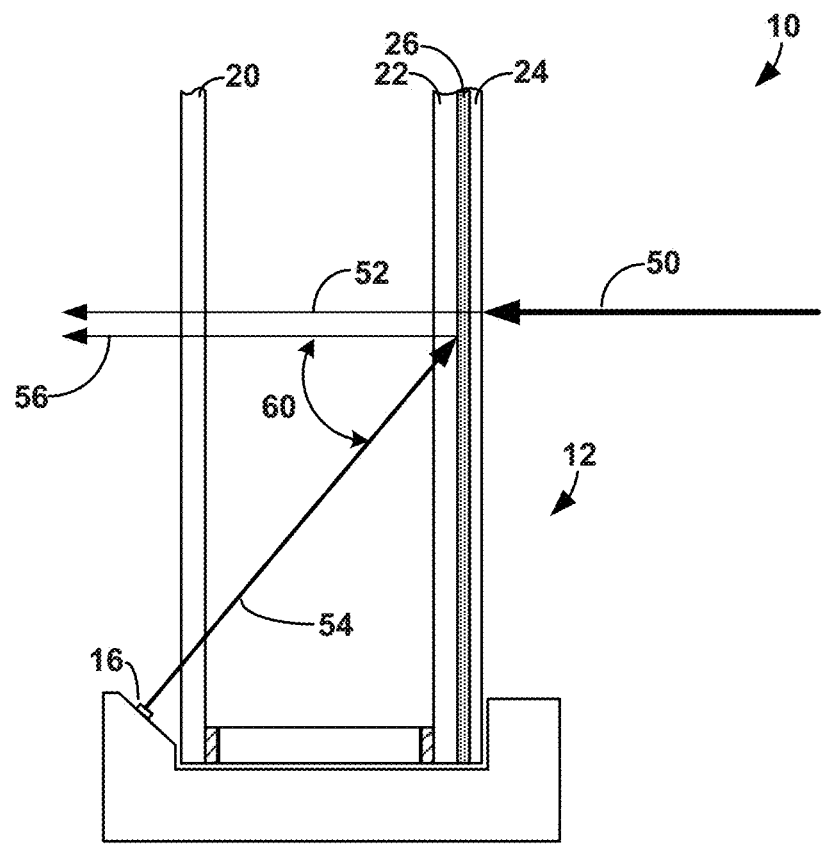
FIG. 2 is a functional illustration of the glazing structure from FIG. 1 illustrating example light pathways during operation of the glazing structure.

FIG. 2 is a functional illustration of glazing structure 10 from FIG. 1 illustrating example light pathways during operation of the glazing structure. As shown in this example, light from a light source 50 located on one side of glazing structure 10 may be directed toward glazing structure 10 when the layer of optically active material 26 is in a light scattering privacy state. Although a majority of the light reaching glazing structure 10 may be scattered and/or absorbed by optically active material 26, a portion of the light 52 may nevertheless pass through the material. This can potentially provide residual visibility through glazing structure 10 to an observer positioned on an opposite side of the structure.

To help mask the portion of light 52 passing through the layer of optically active material 26, light emitting element 16 is configured to emit light that combines with the passing portion of light. In the configuration of FIG. 2, light emitting element 16 is configured to direct light at the layer of optically active material 26 through first substrate 20 and second substrate 22. In particular, light emitting element 16 is configured to direct light 54 that passes through the number one surface of multiple-pane insulating glazing unit 12 provided by first substrate 20 followed by the number two surface of the unit. The light continues by passing through between-pane space 30 followed by the number three surface of the insulating glazing unit provided by second substrate 22 followed by the number four surface of the unit. At least a portion of this light 56 reflects off of the layer of optically active material 26, directing the light in reverse back through the number four surface of multiple-pane insulating glazing unit 12 followed by the number three surface, number two surface, and then number one surface. The light 56 reflecting off of the layer of optically active material 26 can combine with the light 52 passing through the layer of optically active material to mask residual visibility through glazing structure 10.

Although light is conceptually illustrated in FIG. 2 as passing linearly through glazing structure 10, it should be appreciated that in implementation, actual light movement may be more complex than illustrated. For example, a portion of light emitted by light emitting element 16 may reflect each time the light encounters a change in index of refraction. A portion of light may reflect at each of the number one, number two, number three, and number four surfaces of insulating glazing unit 12 with additional light being reflected by the reflective properties of optically active material 26. The amount of light reflected at each surface may vary, e.g., based on the materials of construction and the types of coatings, if any, provided on the substrates.

In some examples, from 5 percent to 40 percent of the light emitted by light emitting element 16, such as from 15 percent to 30 percent, may reflect from the layer of optically active material 26. A remaining portion of the emitted light may pass through or be absorbed by the layer of optically active material 26. A glazing structure with such example properties may be fabricated by using clear glass panes for first substrate 20 and second substrate 22, coating the number two surface of the insulating glazing unit with a low-emissivity coating, and using a liquid crystal material for optically active material 26.

Light emitting element 16 can be located at any position on glazing structure 10 suitable to direct light through at least one of the structure substrates and at the layer of optically active material 26. In the example of FIGS. 1 and 2, light emitting element 16 is positioned on frame 14. In particular, light emitting element 16 is physically connected to first upward extending member 36 and positioned to direct light at the layer of optically active material 26 through first substrate 20 and second substrate 22. In another example, light emitting element 16 can be physically connected to second upward extending member 38 and positioned to direct light at the layer of optically active material 26 through third substrate 24. Light emitting element 16 can be physically connected to frame 14 using, e.g., adhesive, frictional engagement, and/or a mechanical fixation element. If desired, a recessed pocket can be created in frame 14 that is sized and shaped to hold light emitting element 16. Light emitting element 16 can be located on other portions of frame 14 without departing from the scope of the disclosure.

Figure 3:
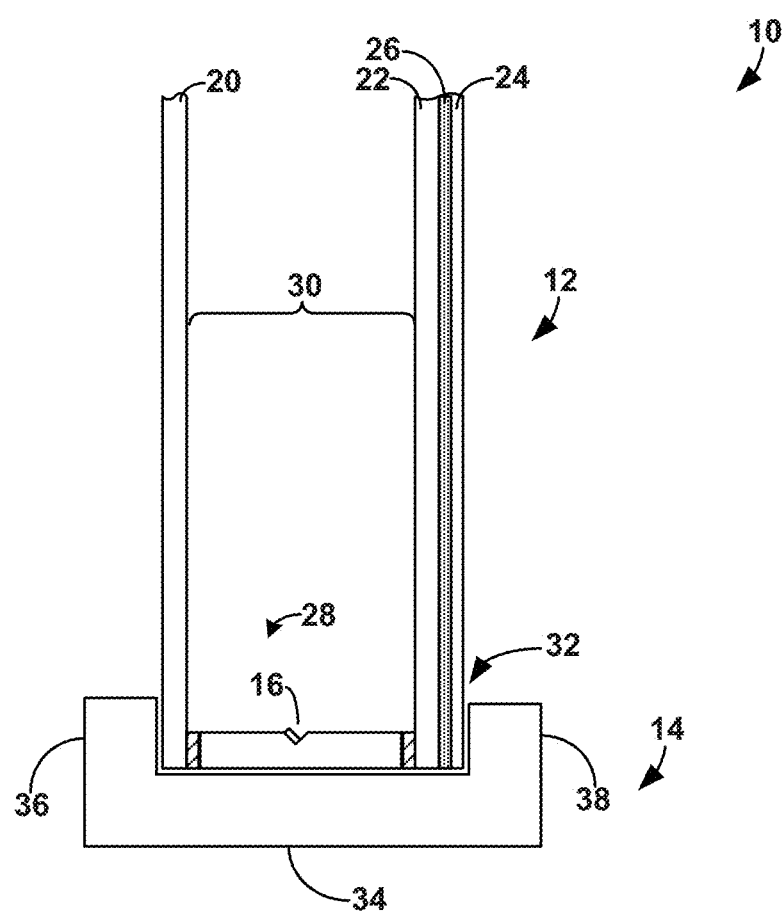
FIG. 3 is a partial side view illustration of another example glazing structure that includes a light emitting element configured to mask residual visibility through the structure.

In addition to or in lieu of connecting a light emitting element to frame 14, light emitting element 16 can be physically connected to a portion of multiple-pane insulating glazing unit 12. In one example, light emitting element 16 is positioned on spacer 28 of insulating glazing unit 12 and configured to direct light at optically active material. FIG. 3 is an illustration of such an example configuration showing glazing structure 10 from FIG. 1 with light emitting element 16 carried by spacer 28 instead of frame 14. As shown in this example, light emitting element 16 is located inside of between-pane space 30 and physically connected to spacer 28. Such an example positioning may be useful to isolate light emitting element 16 from external elements (e.g., water, debris) that can potential obscure or damage the light emitting element.

Independent of the specific location at which a light emitting element is positioned on glazing structure 10, the glazing structure can include any suitable number of light emitting elements. In one example, glazing structure 10 includes a single light emitting element 16 directed at the layer of optically active material 26. In other examples, glazing structure 10 includes a plurality of light emitting elements 16 (e.g., two, three, four, or more) that are each directed at the layer of optically active material 26. When glazing structure 10 includes multiple light emitting elements 16, all the light emitting elements can be positioned on one side of the glazing structure or different light emitting elements can be positioned on different sides of the glazing structure. For example, different light emitting elements can be positioned at different locations about the perimeter of the glazing structure. In the case of a rectangular shaped glazing structure 10, this may involve positioning light emitting elements on at least two different sizes of the structure (e.g., top and bottom, front and back), such as positioning light emitting elements on each of the four sides of the rectangular structure (e.g., top, bottom, right, left). In general, arranging different light emitting elements at different locations about the perimeter of glazing structure 10 can help provide more uniform light emission on optically active material 26 than if all the light emitting elements are positioned at the same general location on the glazing structure.

In one example configuration, glazing structure 10 carries a light emitted element on each side of the structure, with adjacent light emitted elements being separated by a distance ranging from 0.5 feet to 2 feet, such as approximately 1 foot. Other separation distances and configurations are possible, however, and it should be appreciated that the disclosure is not limited in this respect.

In configurations where one or more light emitting elements carried by glazing structure 10 are located on frame 14 and/or spacer 28, the light emitting elements may be positioned to direct light at a non-zero degree angle with respect to a planar face of the glazing structure. Such a configuration can allow the light emitting elements to be positioned out of a line of sight through glazing structure 10 when optically active material 26 is in a light transmissive state yet still direct light upon the material when in a light scattering privacy state.

In FIG. 2, for instance, light emitting element 16 is illustrated as being located on frame 14 and orientated to direct light at an angle 60 measured relative to a normal axis passing through a planar face of multiple-pane insulating glazing unit 12 (e.g., an axis intersecting the planar face at a 90 degree angle). In some examples, each light emitting element 16 is orientated such that its optical axis intersects a planar face of the insulating glazing unit at an angle 60 ranging from 15 degrees to 75 degrees, such as from 30 degrees to 70 degrees, or approximately 60 degrees. The optical axis may be the axis about which emitted light is centered for a particular light emitting element 16.

Light emitting element 16 can be implemented using a variety of different light sources. In different examples, each light emitting element carried by glazing structure 10 can be an incandescent light, a fluorescent light, a halogen light, a neon light, or yet other type of light source. For instance, in one specific configuration, each light emitting element carried by glazing structure 10 is a light emitting diode (LED). The use of light emitting diodes can provide a low power consuming source of light for masking glazing structure 10.

The magnitude of light and the specific wavelengths at which each light emitting element emits can vary depending on the design of glazing structure 10. For example, the magnitude of light emitted by each light emitting element may be selected based on the size of glazing structure 10 and the number of light emitting elements carried by the structure. Similarly, the wavelengths at which each light emitting element emits may be selected based, for example, on characteristics of optically active material 26, such as the color of the material and reflectivity of the material at different wavelengths.

In one example, each light emitting element is configured to emit at a single wavelength. For example, each light emitting element may be a LED emitting green light at 532 nanometers (nm). In another example, each light emitting element is configured to emit light across a range of wavelengths. For example, each light emitting element may be a LED emitting white light. Such a light emitting element can be implemented using a short wavelength LED with a phosphor coating.

During operation of glazing structure 10, the one or more light emitting elements 16 carried by the structure are configured to be active (e.g., supplied with electricity and shining light) when the layer of optically active material 26 is in a privacy state. In some examples, the one or more light emitting elements 16 are continuously active such that the elements emit light when the optically active material 16 is both in a light transmissive state and in a light scattering privacy state. In other examples, the one or more light emitting elements 16 are configured to be inactive (e.g., not supplied with electricity, not shining light) when the layer of optically active material 26 is in a light transmissive state but active when the optically active material is placed in the light scattering privacy state. For example, upon engaging a switch that causes the layer of optically active material 26 to transition from a light transmissive state to a privacy state, an electrical circuit may be closed, thereby supplying electricity to the one or more light emitting elements 16. Conversely, in this example, engaging the switch to cause the layer of optically active material 26 to transition from the privacy state to the light transmissive state may open the electrical circuit, cutting electricity supply to the one or more light emitting elements 16.

Figure 4:
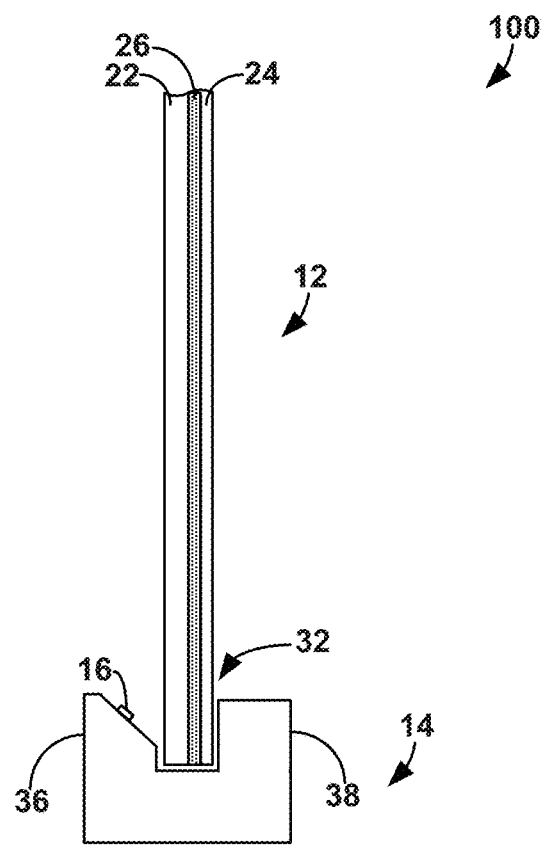
FIG. 4 is a partial side view illustration of another example glazing structure that includes a light emitting element configured to mask residual visibility through the structure.

Although FIGS. 1-3 illustrate one example configuration of glazing structure 10 having a double-pane insulating glazing unit 12, it should be appreciated that other configurations are both possible and contemplated. As one example, glazing structure 10 may be implemented using a single glazing pane instead of a double-pane configuration as shown in FIGS. 1-3. FIG. 4 is a partial side view illustration of another example glazing structure 100 that includes a single glazing pane and a light emitting element. Glazing structure 100 is the same as glazing structure 10 in FIGS. 1-3 except that first substrate 20 and between-pane space 30 have been omitted. Such a structure may be useful in applications where the thermal insulating benefits of a multiple-pane insulating glazing structure are not required, such as for temperate climates or when using the structure in a temperature controlled interior environment. It should be appreciated that terms such single pane and double pane are for purposes of discussion only and are not intended to exclude additional panes, such as a backing pane sandwiching optically active material 26 to the single pane or double pane structure.

Figure 5:
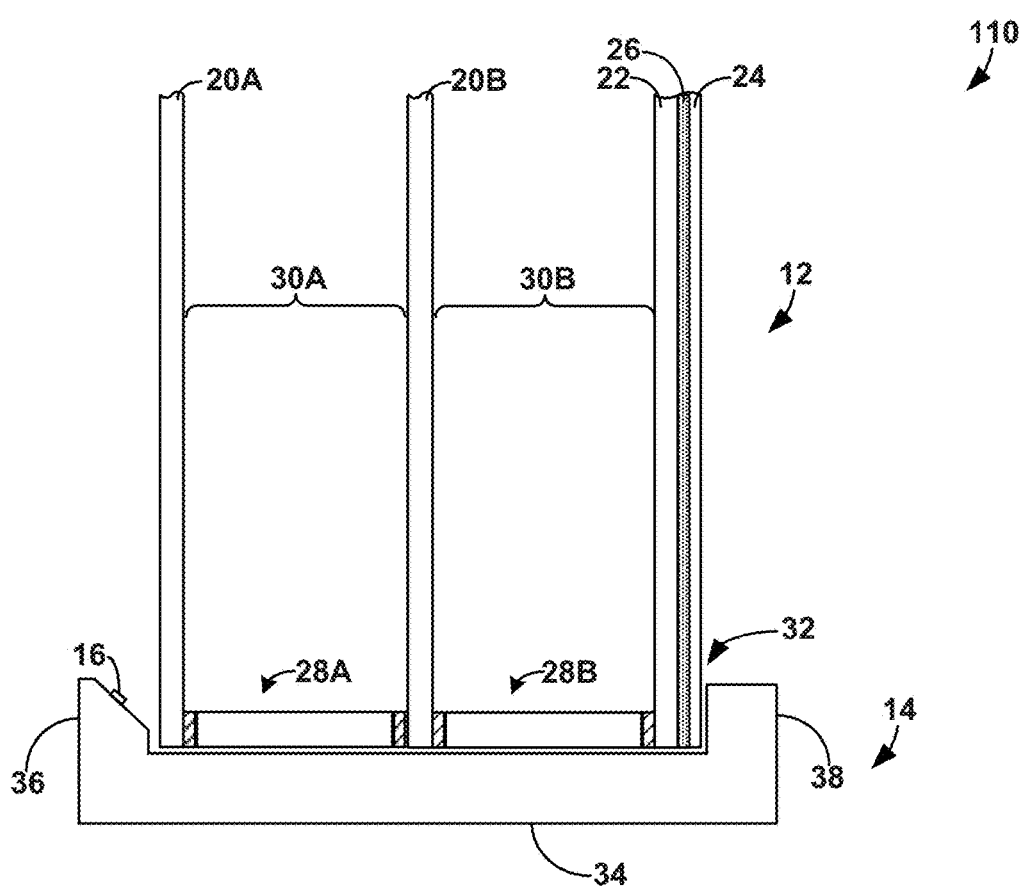
FIG. 5 is a partial side view illustration of another example glazing structure that includes a light emitting element configured to mask residual visibility through the structure.

As yet another example, glazing structure 10 in FIGS. 1-3 may have four or more glazing panes and two or more between-pane spaces. For instance, glazing structure 10 may include a triple-pane insulating glazing unit instead of the double-pane insulating glazing unit shown in FIGS. 1-3. FIG. 5 is a partial side view illustration of another example glazing structure 110 that includes a triple-pane insulating glazing unit. Glazing structure 110 is the same as glazing structure 10 in FIGS. 1-3 except multiple-pane insulating glazing unit 12 includes an additional substrate (designed 20A) separated from the previously-described first substrate (designated 20B) by an additional spacer (designated 28A) to define an additional between-pane space (designated 30A). In this example, the layer of optically active material 26 is positioned between substrate 22 and substrate 24, although in other examples, the optically active material can be positioned between substrate 20A and substrate 24 or substrate 20B and substrate 24.

A variety of different privacy structures have been described with respect to FIGS. 1-5. In general, the example structures have been described in connection with one or more light emitting elements positioned to directed light at an optically active material that reflects a portion of the emitted light. The reflected light can screen visible light transmitted directly through the privacy structure, thereby masking residual visibility through the structure.

In other configurations in accordance with the disclosure, a privacy structure can utilize a light emitting element that emits in a direction facing away from an optically active material (e.g., instead of or in addition to emitting toward the optically active material). For example, one or more light emitting elements can be positioned to emit light in an outwardly facing direction away from the optically active material. The light emitted away from the optically active material can screen direct visible transmission through the optically active material when in a privacy state, thereby masking residual visibility through the structure. For example, the reflected light may prevent the human observer's eyes from adjusting to the low level of light sensitivity necessary to resolve the low level of direct visible transmission still passing through glazing structure 10.

Figure 6A:
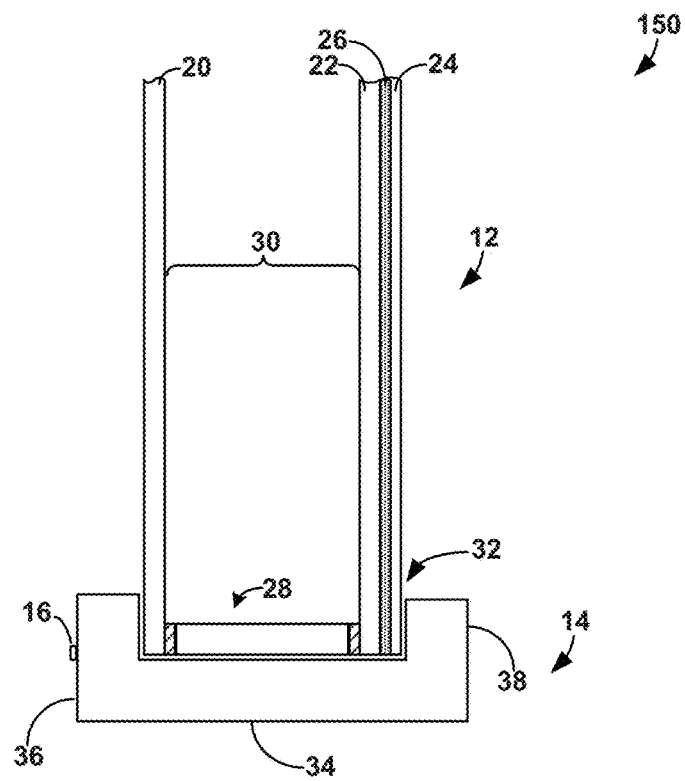
FIGS. 6A and 6B are a partial side view illustration and a front view illustration, respectively, of an example glazing structure that includes a light emitting element directing light away from an optically active material.
Figure 6B:
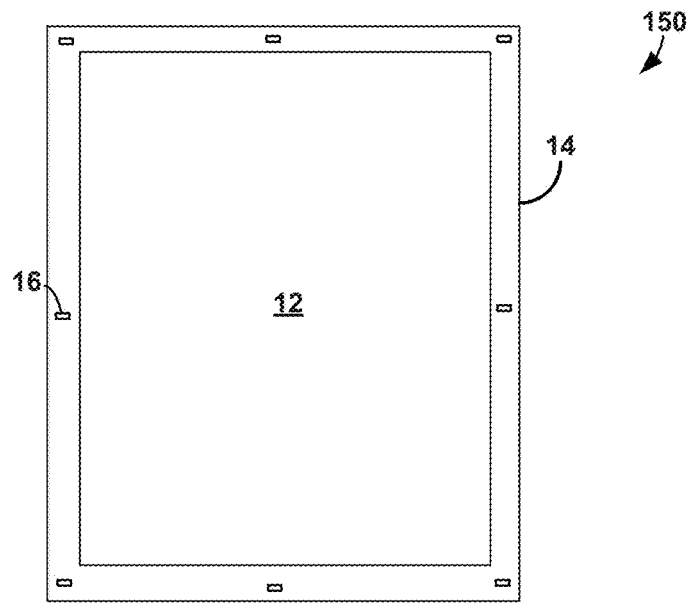

FIG. 6A is a partial side view illustration of an example glazing structure 150 that includes at least one light emitting element 16 directing light away from an optically active material 26 carried by a multiple-pane insulating glazing unit 12. FIG. 6B is a front view of the example glazing structure 150 illustrating the structure carrying a plurality of light emitting elements. Glazing structure 150 is the same as glazing structure 10 in FIGS. 1-3 except that light emitting element 16 is positioned to direct light away from the layer of optically active material 26 rather than towards the layer of material. Such a structure may be useful in exterior wall applications where light emitting elements 16 is positioned facing an outdoor environment and to direct light toward that outdoor environment.

In operation, the one or more light emitting elements 16 (which are illustrated as being a plurality of light emitting elements) of glazing structure 150 can emit light when the layer of optically active material 26 is in a privacy state. The light emitted by the elements can combine with residual light passing through the layer of optically active material 26. This can help optically mask residual visibility through the glazing structure.

Figure 7:
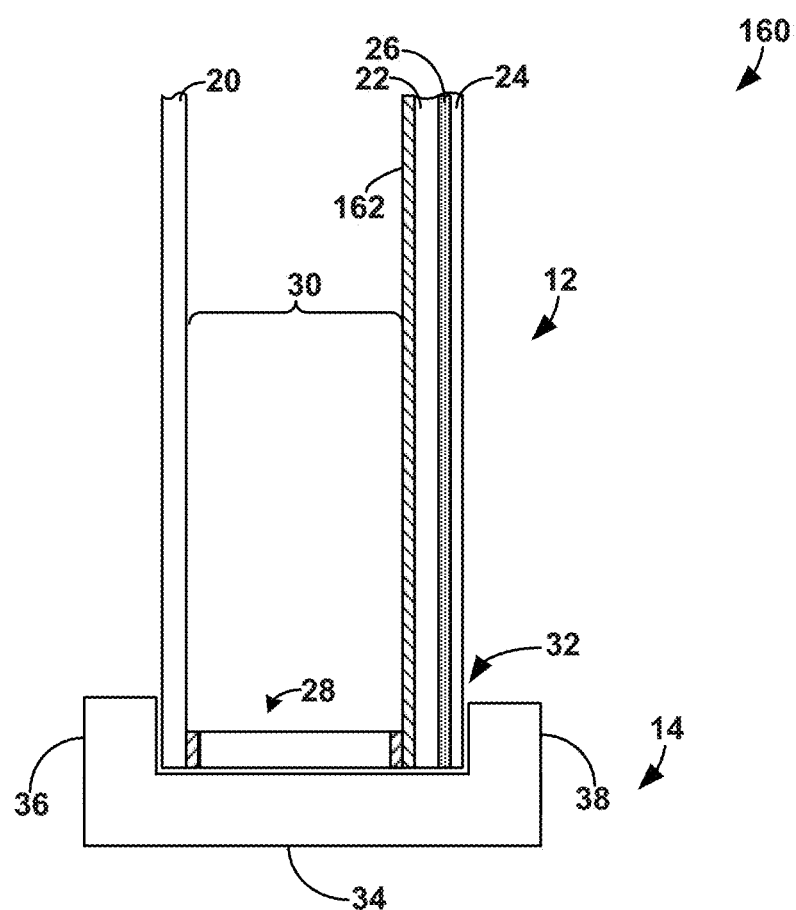
FIG. 7 is a partial side view illustration of another example glazing structure that includes a light emitting element directing light away from an optically active material.

FIG. 7 is a partial side view illustration of another example glazing structure 160 that includes at least one light emitting element 162 directing light away from an optically active material 26 carried by a multiple-pane insulating glazing unit 12. Glazing structure 160 is the same as glazing structure 10 in FIGS. 1-3 except that light emitting element 162 is configured to direct light away from the layer of optically active material 26 (in addition, optionally, to directing light toward the layer of material). Light emitting element 162 is illustrated as being a light emitting coating, such as an organic light-emitting diode film, that is positioned in the number three surface of multiple-pane insulating glazing unit 12. When used, the light emitting coating can be positioned on a different surface of the glazing unit, including any surface of the first substrate 20, the second substrate 22, and/or the third substrate 24. In operation, the light emitting coating of glazing structure 160 can emit light when the layer of optically active material 26 is in a privacy state. The light emitted by the coating can combine with residual light passing through the layer of optically active material 26. This can help optically mask residual visibility through the glazing structure.

A privacy structure in accordance with the disclosure can be used in any desired applications including, without limitation, as a window or door installed in an external wall of a building, a panel or partition installed in an interior of a building, and as a window or panel in an automotive vehicle. In applications in which the structure is installed in an external wall of a building, one or more light emitting elements carried by the structure may be positioned to direct light in a direction from the exterior environment toward the interior environment. This can cause the light to impinge upon a optically active material in a privacy state and reflect back out toward the exterior environment, helping to mask residual visibility through the structure to an observer located outside of the building. Alternatively, the one or more light emitting elements may be positioned to direct light in a direction away from the interior environment and toward the exterior environment. This can cause the externally directed light to interfere with residual light passing through the structure, again helping to mask residual visibility through the structure to an observer located outside of the building.

Various examples have been described. These and other examples are within the scope of the following claims.

The invention claimed is:

1. A glazing structure comprising:
   a first substrate defining an inner surface and an outer surface;
   a second substrate defining an inner surface and an outer surface;
   a layer of electrically controllable optically active material positioned between the inner surface of the first substrate and the inner surface of the second substrate, the electrically controllable optically active material having a light transmissive state and a privacy state; and
   at least one light emitting element positioned to direct light at either the outer surface of the first substrate or the outer surface of the second substrate,
   wherein the at least one light emitting element is configured to be inactive when the electronically controllable optically active material is in the light transmissive state but activate when the electronically controllable optically active material is placed in the privacy state such that light emitted by the at least one light emitting element reflects off the electrically controllable optically active material and through the outer surface of the first substrate or the outer surface of the second substrate at which the light is directed and masks residual visibility through the electrically controllable optically active material when in the privacy state.

2. The glazing structure of claim 1, wherein the glazing structure is part of a multiple-pane insulating glazing unit comprising a third substrate and a spacer holding the third substrate generally parallel to and spaced apart from the first substrate to define a between-pane space filled with an insulative gas, the outer face of the first substrate being positioned inside the between-pane space.

3. The glazing structure of claim 2, wherein the at least one light emitting element comprises a plurality of light emitting elements positioned about the perimeter of the multiple-pane insulating glazing unit.

4. The glazing structure of claim 3, wherein the plurality of light emitting elements are positioned to direct light at the first plane at an angle ranging from 15 degrees to 75 degrees with respect to normal.

5. The glazing structure of claim 2, further comprising a frame positioned around the multiple-pane insulating glazing unit.

6. The glazing structure of claim 5, wherein the at least one light emitting element is positioned in at least one of the spacer of the multiple-pane insulating glazing unit and the frame positioned around the multiple-pane insulating glazing unit.

7. The glazing structure of claim 2, wherein
   the multiple-pane insulating glazing unit defines from an external environment inwards toward an internal environment a number one surface, a number two surface, a number three surface, and a number four surface,
   the third substrate is positioned to provide the number one surface and the number two surface, and the first substrate is positioned to provide the outer surface as the number three surface and the inner surface as the number four surface, and
   the at least one light emitting element is configured to direct light through the number one surface followed by the number two, three, and four surfaces of the multiple-pane insulating glazing unit, at least a portion of which is reflected by the electrically controllable optically active material back through the number four surface followed by the number three, two, and one surfaces of the multiple-pane insulating glazing unit.

8. The glazing structure of claim 1, wherein the electrically controllable optically active material is configured to reflect at least 5 percent of the light emitted by the at least one light emitting element.

9. The glazing structure of claim 1, wherein the electrically controllable optically active material comprises liquid crystals.

10. The glazing structure of claim 9, wherein the electrically controllable optically active material comprises a liquid crystal layer that is optically scattering in an absence of an applied electrical field.

11. The glazing structure of claim 1, wherein the electrically controllable optically active material, when in the privacy state, exhibits a visible transmittance of greater than 0.05 percent.

12. The glazing structure of claim 1, wherein the at least one light emitting element comprises a plurality of light emitting diodes.

13. The glazing structure of claim 12, wherein each of the plurality of light emitting diodes is configured to emit at a single wavelength.

14. A multiple-pane insulating glazing unit comprising:
a first pane of transparent material defining a first surface and second surface;
a second pane of transparent material that is generally parallel to the first pane of transparent material, the second pane of transparent material defining a third surface and a fourth surface;
a spacer positioned between the second surface of the first pane of transparent material and the third surface of the second pane of transparent material to define a first between-pane space;
a layer of electrically controllable optically active material positioned behind the fourth surface of the second pane of transparent material, the electrically controllable optically active material having a light transmissive state and a privacy state; and
at least one light emitting element positioned to direct light at the layer of electrically controllable optically active material through at least the third and fourth surfaces of the second pane of transparent material such that light emitted by the at least one light emitting element reflects off the electrically controllable optically active material and through the third and fourth surfaces of the second pane of transparent material and masks residual visibility through the electrically controllable optically active material when in the privacy state.

15. The multiple-pane insulating glazing unit of claim 14, wherein the at least one light emitting element comprises a plurality of light emitting diodes positioned to direct light at an angle ranging from 15 degrees to 75 degrees with respect to normal.

16. The multiple-pane insulating glazing unit of claim 14, wherein the spacer comprises a first spacer and further comprising:
a third pane of transparent material that is generally parallel to the second pane of transparent material; and
a second spacer positioned between the second pane of transparent material and the third pane of transparent material to define a second between-pane space,
wherein the layer of electrically controllable optically active material is positioned behind the third pane of transparent material and the at least one light emitting element positioned to direct light at the layer of electrically controllable optically active material directs light through at least the second pane of transparent material and the third pane of transparent material.

17. The multiple-pane insulating glazing unit of claim 14, further comprising a frame positioned around the multiple-pane insulating glazing unit.

18. The multiple-pane insulating glazing unit of claim 17, wherein the at least one light emitting element is positioned in at least one of the spacer and the frame positioned around the multiple-pane insulating glazing unit.

19. The multiple-pane insulating glazing unit of claim 14, wherein the first pane of transparent material and the second pane of transparent material each comprises glass.

20. The multiple-pane insulating glazing unit of claim 14, wherein
the multiple-pane insulating glazing unit defines from an external environment inwards toward an internal environment a number one surface, a number two surface, a number three surface, and a number four surface,
the first substrate is positioned to provide the first surface as the number one surface and the second surface as the number two surface and the second substrate is positioned to provide the third surface as the number three surface and the fourth surface as the number four surface, and
the at least one light emitting element is configured to direct light through the number one surface followed by the number two, three, and four surfaces of the multiple-pane insulating glazing unit, at least a portion of which is reflected by the electrically controllable optically active material back through the number four surface followed by the number three, two, and one surfaces of the multiple-pane insulating glazing unit.

21. The multiple-pane insulating glazing unit of claim 14, wherein the electrically controllable optically active material comprises liquid crystals that, when in the light scattering privacy state, exhibit a direct visible transmittance of greater than 0.1 percent.

22. The multiple-pane insulating glazing unit of claim 14, wherein the at least one light emitting element is configured to be inactive when the electronically controllable optically active material is in the light transmissive state but activate when the electronically controllable optically active material is placed in the privacy state.

23. A method comprising:
controlling an optically active material to transition the optically active material from a light transmissive state to a privacy state; and
directing light through a surface of transparent substrate at the optically active material in the privacy state, thereby causing at least a portion of the light to reflect off the optically active material and through the surface of the transparent substrate and mask residual visibility through the optically active material.

24. The method of claim 23, wherein the optically active material comprises liquid crystals, and controlling the optically active material comprises at least one of applying electrical current to the liquid crystals and ceasing delivery of electrical current to the liquid crystals.

25. The method of claim 23, wherein directing light through the transparent substrate comprises directing light at an angle ranging from 15 degrees to 75 degrees with respect to normal.

26. The method of claim 23, wherein directing light through the transparent substrate comprising directing light through a first transparent substrate, a second transparent substrate, and a between-pane space filled with insulative gas separating the first transparent substrate from the second transparent substrate.

27. The method of claim 23, wherein the optically active material, when in the light scattering privacy state, exhibit a direct visible transmittance of greater than 0.1 percent.

28. The method of claim 23, further comprising:
controlling the optically active material to transition the optically active material from the privacy state to the light transmissive state; and
deactivating a light emitting source directing light through the transparent substrate at the optically active material.

* * * * *